(No Model.)
E. H. THALAKER.
NUT LOCK.
No. 518,165. Patented Apr. 10, 1894.
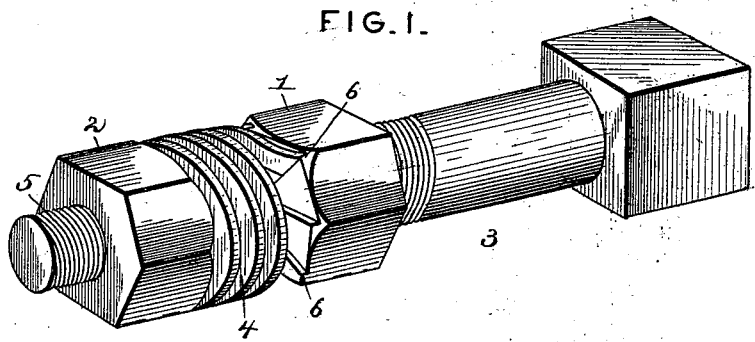
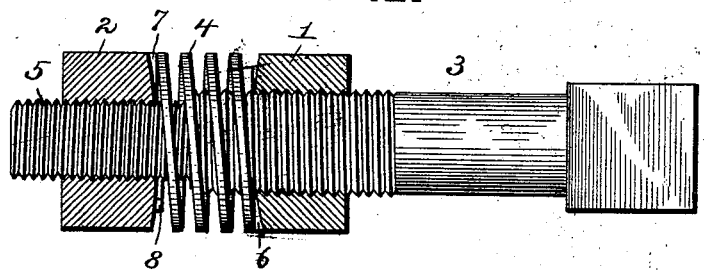
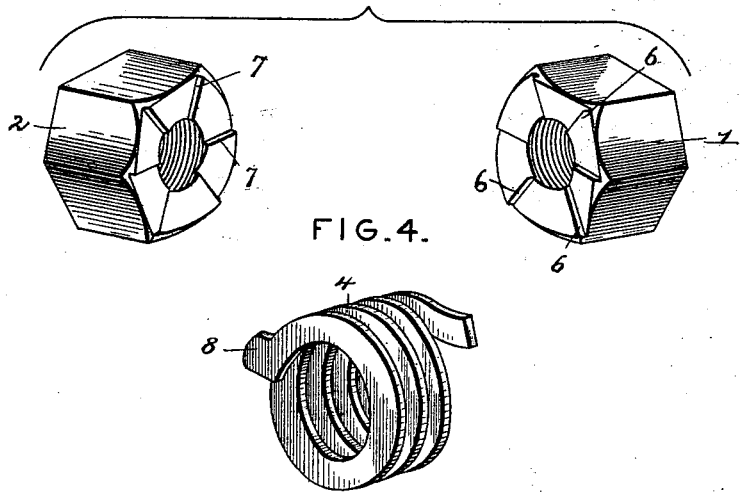
Witnesses
Harry L. Amer.
O. E. A. Doyle
By his Attorneys.
C. A. Snow & Co.
Inventor
Edward H. Thalaker.
THE NATIONAL LITHOGRAPHING COMPANY,
WASHINGTON, D. C.

UNITED STATES PATENT OFFICE.

EDWARD H. THALAKER, OF PETERSBURG, WEST VIRGINIA.

NUT-LOCK.

SPECIFICATION forming part of Letters Patent No. 518,165, dated April 10, 1894.

Application filed January 31, 1894. Serial No. 498,637. (No model.)

*To all whom it may concern:*

Be it known that I, EDWARD H. THALAKER, a citizen of the United States, residing at Petersburg, in the county of Grant and State of West Virginia, have invented a new and useful Nut-Lock, of which the following is a specification.

My invention relates to improvements in nut locks, and has for its object to provide a simple, inexpensive and efficient lock of the class in which right and left nuts are employed.

The objects and advantages of this invention will appear in the following description, and the novel features thereof will be particularly pointed out in the appended claim.

In the drawings: Figure 1 is a perspective view of a nut lock embodying my invention. Fig. 2 is a side view, partly in section. Fig. 3 shows the right and left nuts in perspective. Fig. 4 is a similar view of the spring washer.

Similar numerals of reference indicate corresponding parts in all the figures of the drawings.

The nut lock comprises the right screw-threaded nut 1, the left screw-threaded nut 2, both of which are fitted upon the bolt 3, and the interposed coiled spring washer 4, which bears at its terminals against the facing sides of said nuts. The right screw-threaded nut 1 may be termed the main or securing nut, is threaded upon the body-portion of the bolt, which may be of the ordinary or any preferred construction, and the left screw-threaded nut 2, which may be termed the lock nut, is threaded upon a reduced portion 5 of said bolt. The inner or facing sides of the nuts are provided with shouldered notches 6 and 7, which are disposed relatively in opposite directions, and the spring washer is coiled with a right-hand twist, or to agree with the right-threaded portion of the bolt, whereby, when the parts are in their operative positions, as shown in Figs. 1 and 2, any tendency upon the part of the main nut 1 to loosen, will be in the direction of untwisting the spring; and as this tendency communicated through the spring is in the direction of tightening the lock nut, it is obvious that it would result in an axial compression, or a compression in the direction of the axis of the spring. The terminals of the spring are turned respectively outward and inward to engage positively the shoulders upon the nuts, and the beveled surfaces adjacent to the shoulders and forming the notches with which the nuts are provided, glide over the terminals when the nuts are turned in the direction of tightening. Thus, the spring washer, which is twisted in a direction to agree with the thread engaged by the main nut, is so disposed that a backward or a loosening movement of said nut is in the direction of the length of the spring forming the washer, and is communicated by the latter to the lock nut in the direction of tightening said lock nut. On the other hand, any tendency upon the part of the lock nut to loosen or unscrew is communicated to the washer in the direction of the length of the spring forming the washer, and is communicated by the washer to the main nut in the direction of tightening the latter.

The washer is provided at its outer terminal with a lateral ear 8, by means of which the washer may be compressed axially to release the lock nut by disengaging the outer terminal of the washer from the shoulders of the lock nut to permit of the removal of the members forming the nut lock.

It will be seen that my improvement resides mainly in the direction of coiling or twisting the washer, whereby the spring forming the same is opposed longitudinally to any tendency, by either nut, to turn in the direction of loosening or unscrewing, and communicates such movement to the other nut in the direction necessary to tighten the latter nut.

Changes in the form, proportion, and the minor details of construction may be resorted to without departing from the principle or sacrificing any of the advantages of this invention.

Having described my invention, what I claim is—

In a nut lock, the combination with a bolt having body and reduced portions provided, respectively, with right and left screw-threads, and main and lock nuts threaded respectively upon the body and reduced portions of the bolt and provided in their facing surfaces with shouldered notches disposed in relatively-opposite directions, of a spring washer interposed between said nuts with its terminals in engagement respectively with the notches upon the facing surfaces of the nuts, said spring washer being coiled in the direction of the threads upon that part of the bolt engaged by the main nut, whereby the spring forming the washer is opposed longitudinally to a motion by either nut in the direction of loosening or unscrewing, to communicate such loosening movement of one nut to the other nut in the direction of tightening, substantially as specified.

In testimony that I claim the foregoing as my own I have hereto affixed my signature in the presence of two witnesses.

EDWARD H. THALAKER.

Witnesses:
A. W. DAVIS,
W. C. SMITH.